(12) United States Patent
Rivera et al.

(10) Patent No.: US 11,205,192 B1
(45) Date of Patent: Dec. 21, 2021

(54) AUTOMATED GRAPHIC GENERATION FOR DATA SETS IDENTIFIED USING ARTIFICIAL INTELLIGENCE

(71) Applicant: Amazon Technologies, Inc., Seattle, WA (US)

(72) Inventors: Mark Timothy Rivera, Bothell, WA (US); George Aspland, Seattle, WA (US); Hoa Thi Thieu Vu, Seattle, WA (US); Alabhya Farkiya, Seattle, WA (US); Bo Yang, Redmond, WA (US); Christopher Vander Mey, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 135 days.

(21) Appl. No.: 16/195,334

(22) Filed: Nov. 19, 2018

(51) Int. Cl.
  *G06Q 30/00* (2012.01)
  *G06Q 30/02* (2012.01)
(52) U.S. Cl.
  CPC ..... *G06Q 30/0244* (2013.01); *G06Q 30/0255* (2013.01); *G06Q 30/0269* (2013.01)
(58) Field of Classification Search
  CPC .......... G06Q 30/0244; G06Q 30/0269; G06Q 30/0255

USPC ....................................................... 705/14.43
See application file for complete search history.

(56) References Cited

U.S. PATENT DOCUMENTS

2008/0270223 A1* 10/2008 Collins .................. G06Q 30/02
                                                                705/14.42
2012/0166432 A1* 6/2012 Tseng ................ G06F 16/24578
                                                                707/728

* cited by examiner

*Primary Examiner* — Sun M Li
(74) *Attorney, Agent, or Firm* — Eversheds Sutherland (US) LLP

(57) ABSTRACT

Systems, methods, and computer-readable media are disclosed for systems and methods for automated graphic generation for data sets identified using artificial intelligence. Example methods may include determining a set of user accounts that are similar to a second user account, determining first historical performance data for a first set of digital content associated with the first user account, determining second historical performance data for a second set of digital content associated with the second user account, and generating a first score for the first user account. Example methods may include determining a first number of search queries associated with the first user account, determining a second number of search queries associated with the second user account, generating a second score for the first user account, causing presentation of the first score and the second score at a user interface, and generating an action recommendation for the first user account.

14 Claims, 7 Drawing Sheets

AUTOMATED GRAPHIC GENERATION FOR DATA SETS IDENTIFIED USING ARTIFICIAL INTELLIGENCE

BACKGROUND

Various entities may generate digital content for consumption by users. For example, digital content such as images, videos, text, and other content may be generated and presented to users. A number of users that engage with the content, such as by viewing the content, may be a data point indicative of a performance of the particular content. Additional performance metrics may be used to determine, for example, whether users are interested in the content. However, performance metrics for content may be useful to content creators and other entities when compared to performance metrics for content generated by other users or entities. Identification of relevant users for content performance metric comparison and/or determinations may be difficult. Accordingly, identifying data sets of particular users or entities and generating graphical data automatically may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 5A-5B are schematic illustration of example user interfaces including automated graphic generation for data sets identified using artificial intelligence in accordance with one or more example embodiments of the disclosure.

DETAILED DESCRIPTION

Overview

Figure 1:
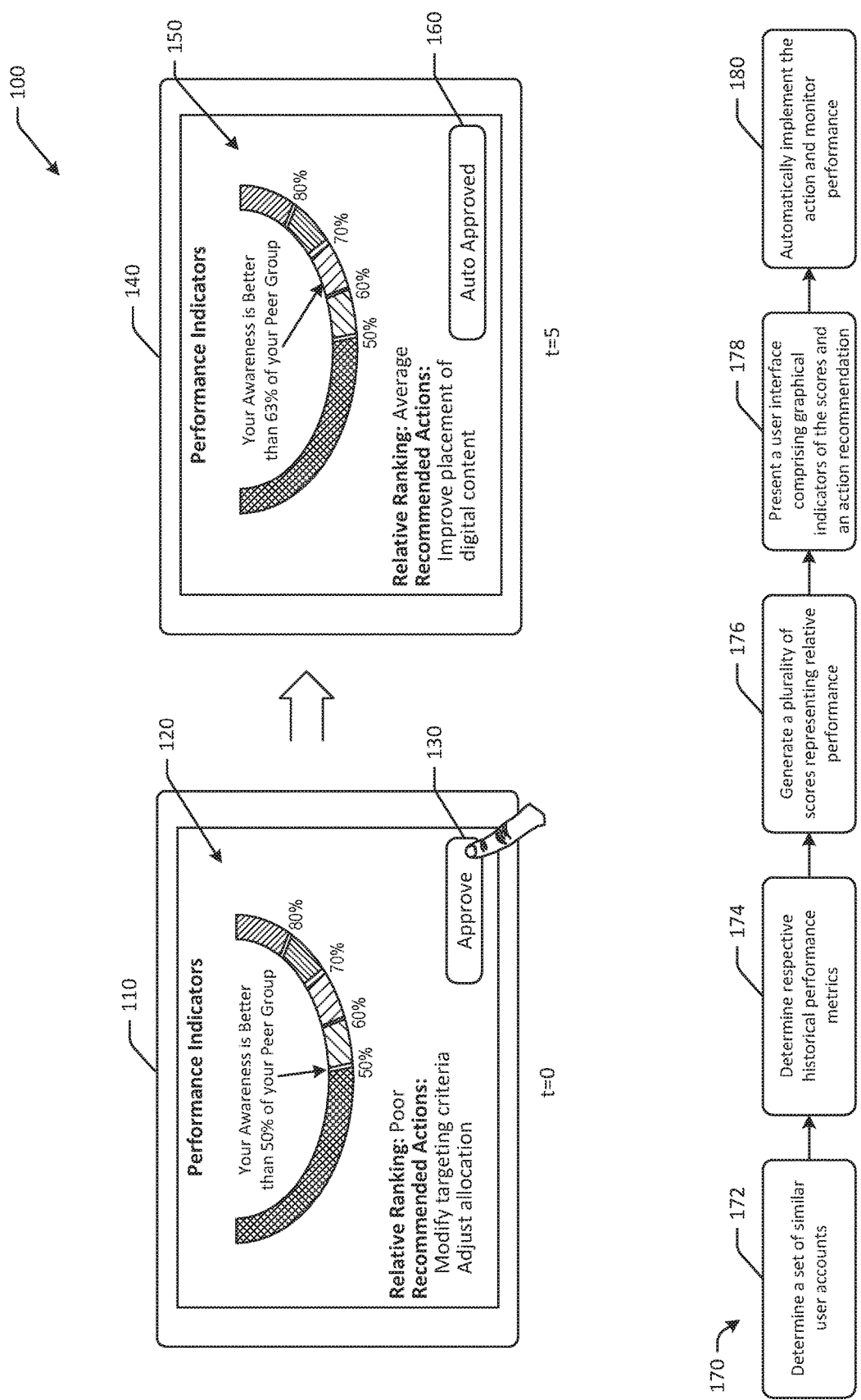
FIG. 1 is a schematic hybrid illustration of an example use case and process flow for automated graphic generation for data sets identified using artificial intelligence in accordance with one or more example embodiments of the disclosure.

Digital content may include images, videos, audio, text, and/or other content that may be presented to users via electronic devices. Users may create content for any number of purposes. For example, digital content may include promotional content, targeted content, entertainment content, informational content, and/or other content or combinations thereof. Content creators and/or users may desire to determine one or more performance metrics of the content that the user generates. Such performance metrics may be determined using electronic data captured by one or more user devices at which the content is presented. For example, user interaction data, user engagement data, and/or other performance metrics may be determined using data such as a number of times content was viewed at an electronic device, a length of time content was viewed or presented, a number of related user actions that occurred after presentation of content (e.g., whether a user performed a search related to the content, etc.), and so forth.

Performance metrics alone may be useful to users as the performance metrics can be used to measure changes in performance for content associated with the user over time. However, changes in performance specific to a user may be ineffective at determining the performance of content relative to other users. For example, user engagement metrics for content associated with a content creator may be sufficient to satisfy the content creator, but may actually be significantly worse than user engagement metrics for content associated with a different, but sometimes similar, content creator. Without the comparative or relative data, content creators may be unaware of the relative performance of their content. Once relative performance is determined, the user, such as the content creator, may be able to implement one or more changes to improve performance relative to other similar users. However, the user may be unaware of the changes needed to improve relative performance.

Embodiments of the disclosure automatically generate graphical indicators for data sets to illustrate relative performance metrics for different sets of digital content. In some embodiments, peer user accounts, or accounts associated with digital content to use for comparison or relative performance determinations, may be determined using artificial intelligence. Certain embodiments may automatically determine action recommendations that can be implemented automatically to modify relative performance metrics. For example, action recommendations may be determined using historical data associated with a different user account. Users may use the automatically generated graphical content and action recommendations to improve performance metrics associated with digital content.

This disclosure relates to, among other things, devices, systems, methods, computer-readable media, techniques, and methodologies for automated graphic generation for data sets identified using artificial intelligence. Certain embodiments may increase efficiency and performance associated with selection, delivery, and performance of digital content. Using machine learning and/or artificial intelligence, some embodiments may automatically implement one or more changes to user settings without active input from a user. Certain embodiments may use artificial intelligence to identify peer groups and/or similar user accounts that can be used to determine relative performance metrics for digital content.

As described herein, certain embodiments use artificial intelligence to determine peer user accounts and action recommendations. Artificial intelligence may be used to modify one or more rules or actions in or near real-time and/or responsive to one or more user inputs. As a result, embodiments of the disclosure may be significantly faster than traditional user account setting modification suggestions and may utilize a reduced amount of computing resources and bandwidth relative to typical performance metric calculation processes.

Referring to FIG. 1, an example use case 100 for automated graphic generation for data sets identified using artificial intelligence is depicted in accordance with one or more example embodiments of the disclosure. In FIG. 1, a first user interface 120 may be presented at a user device display at a first instance 110 (as indicated by "t=0"). The first user interface 120 may include one or more graphical indicators representing performance metrics or performance indicators for a user account. The user account may be, for example, an advertiser user account, a brand user account, or another entity user account. The performance metrics may represent performance of digital content associated with the respective user account. For example, a brand user account may be associated with a number of digital content items, including videos, images, text, audio, and/or other digital content. The specific performance metrics illustrated at the first user interface 120 may indicate the performance of the user account relative to one or more other user accounts.

The other user accounts, or peer groups of user accounts, used for the relative performance comparison may be user accounts for other brands, other advertisers, and/or may be determined using one or more attributes. For example, the other user accounts may include user accounts that are associated with similar products or product categories, in the event that the user account is a brand user account. In another example, the other user accounts may include user accounts that are associated with items of similar value, but not necessarily in the same product category. Additional examples of attributes that may be used to determine peer groups may include a content spend value associated with the respective user accounts, a product catalog associated with the respective user accounts, campaign targeting associated with the respective user accounts, brand ownership associated with the respective user accounts, and/or other attributes. Peer groups may be modified by users, and may be selected by users in some instances. Peer groups may be used by user account owners to determine relative performance against competitors in some embodiments. In some embodiments, peer groups may be automatically determined based at least in part on specific product categories of products associated with the user account, as well as bid ranges for content placement, product pricing, sales volume, related pricing, etc. Such automated determination may result in unique comparison data. For example, a hardware tool manufacturer may be placed in a peer group for an electronics manufacturer, although the products each company sells may be dissimilar. However, the product pricing, consumer consideration time (e.g., how many impressions are presented to a consumer prior to presentation, etc.), and/or other factors may be similar, as determined using one or more machine learning algorithms and/or artificial intelligence features. Accordingly, performance of content associated with the electronics manufacturer may be compared to performance of content associated with the hardware tool manufacturer.

At the first instance 110, the graphical indicators at the first user interface 120 may indicate that content associated with the user account has an "awareness" rating or score that is better than 50% of the peer group for the user account. Accordingly, the user may determine that the content and/or content strategies implemented by the user account are more effective than half of the other user accounts in the peer group, where the peer group performance is determined using the respective content associated with the peers. The user may use the graphical indicator(s) presented at the first user interface 120 to quickly determine a performance of the user account's content and/or delivery strategies (e.g., spend, targeting, etc.) relative to other user accounts.

The first user interface 120 may include one or more action recommendations for the user account. For example, as illustrated at the first user interface 120, action recommendations of modifying targeting criteria and adjusting allocation may be presented. The one or more action recommendations may be determined based at least in part on historical data associated with a different user account. The different user account may or may not be included in the peer group. For example, the different user account may be a user account that previously was in a similar brand stage relative to the user account (e.g., as determined by number of sales, revenue, sales volume, etc.), but has since grown to a different brand stage (e.g., from startup to midsize business, etc.). Based at least in part on actions that the different user account implemented while the different user account was in the startup stage, for example, the action recommendations for the user account may be determined. In some embodiments, action recommendations may be determined based at least in part on differences between attributes of the user account (e.g., ad spend, spend allocation, targeting, etc.) and attributes of more successful or better performing user accounts in the peer group. For example, a user account with a better awareness score may have targeting criteria for their content that is more effective than the targeting content used by the user account for which the action recommendations are generated. Accordingly, action recommendations of modifying targeting criteria and adjusting allocation may be determined for the user account. In some instances, a relative ranking value of poor may also be presented at the first user interface 120 to illustrate that the content associated with the user account is not performing well relative to the peer group user accounts.

The first user interface 120 may include a selectable option 130 to approve the recommended actions. The selectable option 130 may be selected by a user and may cause one or more remote systems to implement the recommend actions. The actions may be implemented by modifying one or more user settings, changing one or more attributes associated with user accounts or user content, and/or other modifications.

At a second instance 140, a second user interface 150 may be presented at the user device. The second instance 140 may occur at a later point in time, as designated by "t=5" in the illustration of FIG. 1. The second user interface 150 may indicate that performance metrics for content associated with the user account result in an awareness score that is better than 63% of the peer group, where the peer group may or may not be the same as the peer group at the first instance 110. Using the graphical indicators presented at the second user interface 150, the user may determine that the previously implemented recommended actions resulted in a positive impact on the awareness rating or score for the user account and/or for content associated with the user account.

The second user interface 150 may include a relative ranking of average and one or more recommended actions, which may be generated based at least in part on one or more machine learning algorithms using historical data. The recommended actions may include, for example, improving placement of digital content. For example, content placed "above the fold" may be more desirable, as far as placement, than content "below the fold."

The second user interface 150 may include an auto-approved indicator 160, which may indicate that the recommended actions will be automatically implemented by the remote server. The user may therefore not have to input or actively indicate that the recommended actions are to be implemented. To implement the recommended actions, the remote server may use artificial intelligence. For example, to improve the placement of digital content, more than one setting or account attribute may need to be modified. For example, during auction processes for content slots that are above the fold or that have premium placement, bids generated by the system for content associated with the user account may be automatically increased, so as to increase a likelihood that the content slot will be won and an impression will be presented. Certain modifications made automatically on behalf of the user account may be implemented at various times and may not be subject to any rules. For example, a maximum bid rule of $0.40 may be automatically exceeded (in some instances with or without permission) in instances where the placement of a content slot is determined to be of value or may be desirable for a particular user or demographic. Accordingly, certain embodiments may automatically implement one or more recommended actions to improve performance metrics associated with a user account and/or metrics for content associated with the user account.

To automatically generate graphics for data sets identified using artificial intelligence, an example process flow 170 is presented and may be performed, for example, by one or more action implementation modules at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 170 of FIG. 1.

At a first block 172, a set of similar user accounts to a first user account may be determined. For example, similar user accounts may include user accounts with similar consumers or consumer types, user accounts associated with brands at a similar lifecycle stage, user accounts associated with similar products or product categories (as well as product attributes, such as pricing, etc.), user accounts associated with similar geographic regions, and/or other similarity metrics. The set of similar user accounts may be determined to be a peer group for the first user account.

In one particular example, similar user accounts may be determined using product categories. For example, one or more peer group determination modules at the remote server may be executed to determine a first set of product identifiers associated with the first user account. The remote server may determine that a majority of the first set of product identifiers are associated with a first product category. For example, the first user account maybe associated with cell phones, a majority of which may be associated with an electronics product category. The remote server may determine a second set of product identifiers associated with a second user account, and may determine that a majority of the second set of product identifiers are associated with the first product category, or, in this example, the electronics product category. The remote server may therefore determine that the second user account is similar to the first user account.

In another example, similar user accounts may be determined using consumer types, brand size, and/or product pricing. For example, one or more peer group determination modules at the remote server may be executed to determine first demographic data associated with purchasers of a first set of product identifiers associated with the first user account, such as fiction books. The remote server may determine second demographic data associated with purchasers of a second set of product identifiers associated with a second user account, such as fashion magazines. The remote server may determine a first total number of conversion events associated with the first user account, where conversion events may be purchases of the product, signups to a mailing list, subscriptions, or other conversion events. The remote server may determine a second total number of conversion events associated with the second user account. The remote server may determine a first average price associated with the first set of product identifiers, and a second average price associated with the second set of product identifiers. The remote server may determine that the second user account is similar to the first user account based at least in part on the first demographic data, the second demographic data, the first total number, the second total number, the first average price, and/or the second average price.

At a second block 174, respective historical performance metrics may be determined. For example, the remote server may receive a request to generate graphical data illustrating performance metrics of the user account relative to similar user accounts. One or more score generation engine and/or modules at the remote server may therefore be executed to determine respective historical performance metrics for the first user account and the peer group of user accounts, or the similar user accounts. The historical performance metrics may include data related to content associated with the respective user accounts, and may be for a certain preceding time interval, such as the previous seven days, the previous month, or another time interval. The historical performance metrics may include brand specific performance data in some instances, such as sales metrics, consideration timeframes, detailed page views, brand or product searches, and so forth.

At a third block 176, a plurality of scores representing relative performance of the first user account relative to the similar user accounts may be generated. For example, one or more score generation engine and/or modules at the remote server may be executed to generate one or more scores indicative of relative performance. The scores may include an awareness score, a consideration score, a purchase score, and/or other or different scores. An awareness score may be used to monitor a value of brand awareness that digital content associated with a user account is building. As consumers are exposed to the digital content, the digital content may create recurring touch points that build awareness of products and/or a brand. Awareness may be a step in building brand affinity. Awareness may lead consumers to start considering a brand and/or products before they, for example, complete a search for a particular brand or product. Accordingly, monitoring queries for brands and/or specific products may be indicative of awareness for the brand/product. Awareness may be directly linked to consideration and purchase metrics for brands and/or products. The awareness score may reflect the impact of the content associated with a user account on the awareness of a brand or products associated with the user account.

In one example, an awareness score may be calculated by the score generation engine by determining a first number of search queries associated with the first user account, and determining a second number of search queries associated with the second user account. The remote server may generate an awareness score for the first user account based at least in part on a difference between the first number and the second number.

A consideration score may be used to monitor how well digital content and a digital presence of a brand associated with a user account drives value by enabling consumers to discover and consider the brand and/or products. When a consumer is considering a purchase, the consumer may explore a number of products (e.g., via search results, browsing, etc.), and/or digital stores. In some instances, a consumer may iteratively reduce a number of options available until the consumer finds the right product. In other instances, consumers may not have a purchase in mind, but may browse to be inspired to a purchase. In both instances, content and digital presence impact a long term relationship with that particular consumer. Each consideration event (e.g., visiting a store, viewing a product page, adding a product to a wish list, reading a review, searching, etc.) may incrementally increase the consumer's affinity for a brand or product. The consideration score may reflect the impact of the content associated with a user account on the consideration window or timeframe of a brand or products associated with the user account.

In one example, a consideration score may be calculated by the score generation engine by determining a first set of digital content associated with the first user account, and determining a first average number of impressions prior to a conversion event for the first set of digital content. The remote server may determine a second set of digital content associated with the second user account, and may determine a second average number of impressions prior to a conversion event for the second set of digital content. The remote server may generate a consideration score for the first user account based at least in part on a difference between the first average number and the second average number.

The purchase score may be used to monitor how well digital content and the products associated with the digital content are set up to complete a purchase by a consumer that is considering the product. Awareness and consideration may be of limited value if consumers do not complete purchases. For example, if digital content or related products target irrelevant keywords, or the products have an insufficient number of user reviews, the products may not be purchased. The purchase score may reflect the impact of the content associated with a user account on the purchase experience for consumers. Purchase scores may be calculated, in one example, using metrics such as cost-per-click, click-through-rates, percentage of top placement, percentage of searches lost due to out of budget, buy box percentage, average review score, and/or percentage out of stock.

In one example, a consideration score may be calculated by the score generation engine by determining a first average product review score for the first set of product identifiers, and determining a second average product review score for the second set of product identifiers. The remote server may generate a purchase score for the first user account based at least in part on a difference between the first average product review score and the second average product review score.

Calculation of scores may be unique to technological environments because the data needed to capture and determine accurate scores may need to be aggregated from various digital platforms. However, different platforms may be operated by different entities, and the resultant data may therefore be disparate. Certain embodiments may provide a platform that can be used to capture relevant data in a central location, thereby enabling the functionality described herein.

At a fourth block 178, a user interface comprising graphical indicators of the scores and an action recommendation may be presented. For example, the remote server may generate a user interface with one or more graphical indicators that represent the respective scores, as well as an action recommendation. The action recommendation may be determined by the remote server based at least in part on modeling or machine learning that provides modifications to user settings that may provide lift or improve relative performance of content associated with a user account. For example, to determine an action recommendation, one or more action implementation module(s) at the remote server may determine that a first set of targeting criteria associated with the first set of digital content is different than a second set of targeting criteria associated with the second set of digital content, and may generate an action recommendation for the first user account, where the action recommendation includes a recommendation to replace the first set of targeting criteria with the second set of targeting criteria. Accordingly, the content associated with the first user account may be better targeted and may therefore improve performance.

The graphical indicators and action recommendation may be sent to a user device for display at a display device. The remote server may therefore cause presentation of the awareness score, the consideration score, and the purchase score at a user interface. In a particular example, the score generation engine at the remote server may generate a first graphical indicator representing the awareness score relative to the second user account, generate a second graphical indicator representing the consideration score relative to the second user account, and generate a third graphical indicator representing the purchase score relative to the second user account. The remote server may cause presentation of the first graphical indicator, the second graphical indicator, and the third graphical indicator at the user interface.

At a fifth block 180, the action may be automatically implemented and subsequent performance may be monitored. For example, the action implementation module(s) at the remote server may be executed to receive an approval indication from the user interface indicating that the recommended actions are to be automatically implemented, and the remote server may cause the recommended actions to be automatically implemented. For example, the remote server may cause the first set of targeting criteria to be replaced with the second set of targeting criteria. Subsequent recommended actions may be automatically implemented without user input.

Example embodiments of the disclosure provide a number of technical features or technical effects. For example, in accordance with example embodiments of the disclosure, certain embodiments of the disclosure may automatically implement changes to user settings, content attributes, content delivery settings, and other configuration mechanisms. Certain embodiments may use machine learning to determine recommended actions, and may use artificial intelligence to identify similar user accounts that may be used for relative score generation. Some embodiments may automatically generate graphical indicators of relative performance.

Embodiments of the disclosure may improve computing efficiency and bandwidth by reducing an amount of data for querying, reducing manual inputs, and increasing speed of processing. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
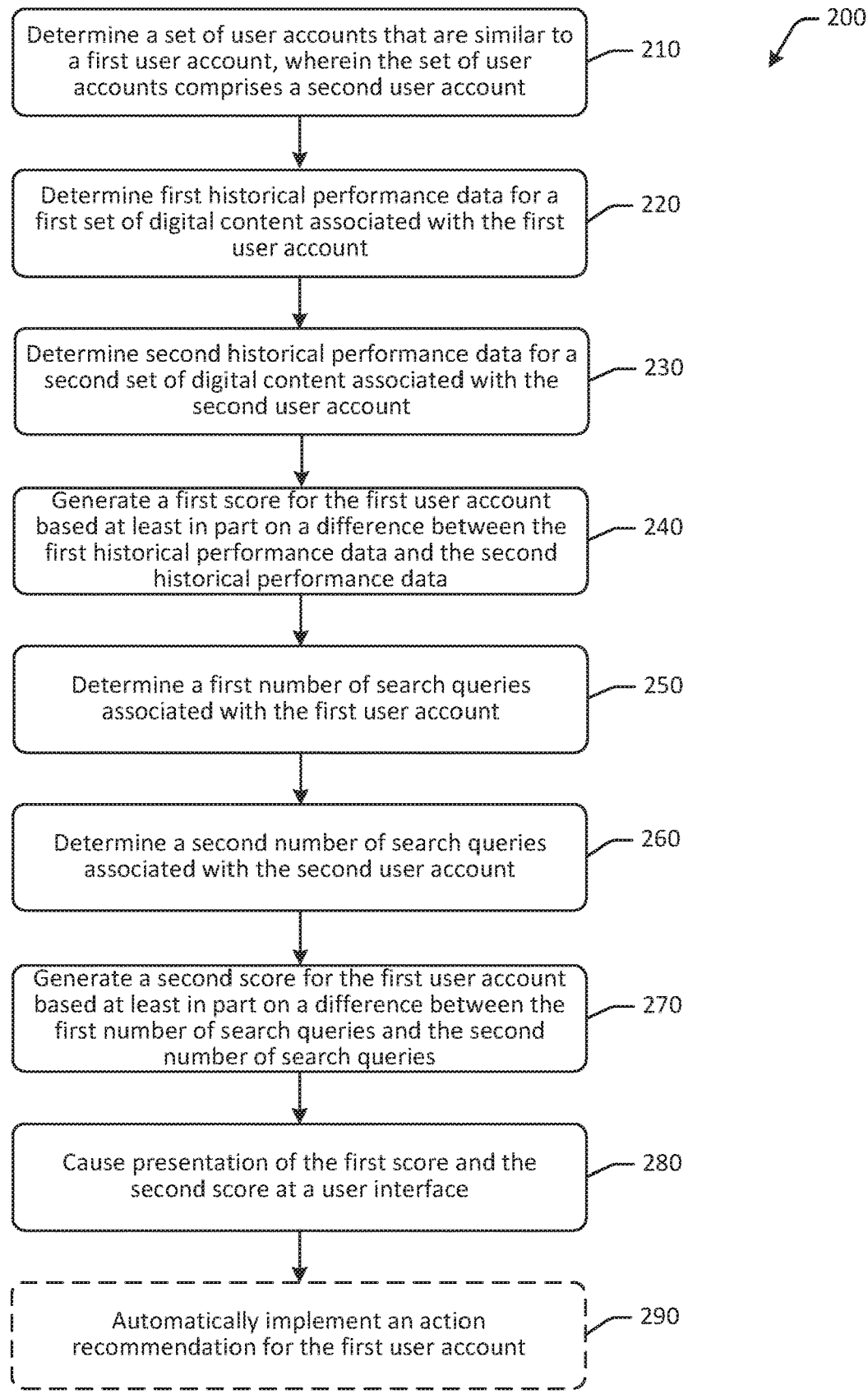
FIG. 2 is a schematic illustration of an example process flow for automated graphic generation for data sets identified using artificial intelligence in accordance with one or more example embodiments of the disclosure.

FIG. 2 is a schematic illustration of an example process flow 200 for automated graphic generation for data sets identified using artificial intelligence in accordance with one or more example embodiments of the disclosure. While example embodiments of the disclosure may be described in the context of digital content, it should be appreciated that the disclosure is more broadly applicable to any type of data. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a set of user accounts that are similar to a first user account, wherein the set of user accounts comprises a second user account. For example, one or more peer group determination modules at a remote server may determine data associated with the first user account. The data may include a product catalog that may include one or more product identifiers of products, digital content data and associated product identifiers, historical sales data, historical content performance metrics, and/or other data. Based at least in part on the data associated with the first user account, the remote server may determine one or more similar user accounts. The similar user accounts may be a peer group, or a set of user accounts that is similar to the first user account. Similarity may not be based only on product categories in some embodiments. For example, peers can be from different product or brand categories, but may target similar consumers, or may have similarly priced products, and so forth. In some embodiments, the set of user accounts determined to be similar to the first user account may be at least partially designated by the first user account. For example, a user of the first user account may identify certain competitors as peers, and those competitors may be included in the set of user accounts.

In some embodiments, artificial intelligence may be used to identify the set of user accounts determined to be similar to the first user account. For example, the peer group determination module at the remote server may be executed to determine a content spend value associated with the first user account. The remote server may determine targeting criteria for the first set of digital content. The targeting criteria may indicate consumers to whom content associated with the first user account is presented. The targeting criteria may include demographic information, contextual information, geographic information, and/or other information used to target content. The remote server may determine a set of product identifiers associated with the first user account. The remote server may determine the set of user accounts that are similar to the first user account using one or more of the content spend value, the targeting criteria, and the set of product identifiers. For example, other user accounts that target similar consumers or consumer types may be determined to be similar user accounts. Other user accounts that have similar content spend values may be determined to be in similar brand lifecycle stages and may therefore be determined to be similar user accounts. Other user accounts that are associated with similar products (e.g., as determined using product category classifications, etc.) may be determined to be similar user accounts. However, as brand lifecycle changes occur and content performance metrics change, the similar user accounts may change with respect to the first user account. Accordingly, artificial intelligence may be used to determine which user accounts are determined to be similar user accounts at any particular point in time.

In another example, similar user accounts may be determined using artificial intelligence. For example, the peer group determination module at the remote server may be executed to determine respective product category identifiers associated with the set of product identifiers, and may determine demographic data associated with purchasers of the set of product identifiers. The remote server may determine the set of user accounts that are similar to the first user account using one or more of the content spend value, the targeting criteria, the set of product identifiers, the respective product category identifiers, and the demographic data.

In another example, similar user accounts may be determined using artificial intelligence. For example, the peer group determination module at the remote server may be executed to determine a set of product identifiers associated with the first user account, and determine an average price associated with the set of product identifiers. The remote server may determine the set of user accounts that are similar to the first user account using the average price.

In some embodiments, similarity may be determined using average browse node hierarchy. For example, a distance between average browse node hierarchies may be determined. The distance may be represented as a numeric or alphanumeric difference and may be indicative of an overlap or similarity between the respective average browse nodes.

At block 220 of the process flow 200, computer-executable instructions stored on a memory of a device, such as a remote server or a user device, may be executed to determine first historical performance data for a first set of digital content associated with the first user account. For example, a score generation engine/module(s) at a remote server may be executed to determine a first set of digital content associated with the first user account. The first set of digital content may include one or more content items that may be presented to users at user interfaces. The remote server may determine first historical performance data that corresponds to individual or aggregate performance of the first set of digital content. The first historical performance data may include user interaction metrics (e.g., how many users viewed the content, clicked on the content, listened to the content, etc.), delivery metrics (e.g., a cost to deliver, placement of the content, etc.), and so forth. In some instances, the first historical performance data may include attributed purchase information, which may be indicative of purchases of products attributed to the respective content in the first set of content.

At block 230 of the process flow 200, computer-executable instructions stored on a memory of a device, such as a remote server or a user device, may be executed to determine second historical performance data for a second set of digital content associated with the second user account. For example, the score generation engine/module(s) at a remote server may be executed to determine a second set of digital content associated with the second user account. The second set of digital content may include one or more content items that may be presented to users at user interfaces. The remote server may determine second historical performance data that corresponds to individual or aggregate performance of the second set of digital content. The second historical performance data may include user interaction metrics (e.g., how many users viewed the content, clicked on the content, listened to the content, etc.), delivery metrics (e.g., a cost to deliver, placement of the content, etc.), and so forth. In some instances, the second historical performance data may include attributed purchase information, which may be indicative of purchases of products attributed to the respective content in the second set of content. The second historical performance data may be used to determine a relative comparison for the first user account.

At block 240 of the process flow 200, computer-executable instructions stored on a memory of a device, such as a remote server or a user device, may be executed to generate a first score for the first user account based at least in part on a difference between the first historical performance data and the second historical performance data. For example, the score generation engine/module(s) at the remote server may be executed to generate a first score for the first user account. The first score may be determined for the first set of content and/or the first user account. The first score may be indicative of the first user account performance relative to the second user account. The difference in historical performance data may include differences in one or more individual categories of the historical performance data determined for the respective first user account and second user account.

In some embodiments, the score generation engine/module(s) at the remote server may be executed to determine a first average product review score for the first set of product identifiers, and to determine a second average product review score for the second set of product identifiers. The remote server may generate the first score for the user account based at least in part on the difference between the first historical performance data and the second historical performance data, as well as a difference between the first average product review score and the second average product review score. The first score may be a purchase score or a consideration score in some embodiments.

At block 250 of the process flow 200, computer-executable instructions stored on a memory of a device, such as a remote server or a user device, may be executed to determine a first number of search queries associated with the first user account. For example, the score generation engine/module(s) at the remote server may be executed to determine a first number of search queries associated with the first user account. The search queries may be for queries that include a brand name associated with the first user account, products associated with the first user account and/or associated with the content in the first set of digital content, or other related queries. The specific use of terms related to the first user account may be indicative of an impact of content associated with the first user account being presented to users. In order to determine the number of search queries, the search queries may have to be received at, and/or processed by, a central platform, otherwise the data may be unavailable (e.g., a third party may have the data, etc.). The number of search queries may be determined for a particular time period, such as the preceding week, or since a particular content campaign was launched, etc.

At block 260 of the process flow 200, computer-executable instructions stored on a memory of a device, such as a remote server or a user device, may be executed to determine a second number of search queries associated with the second user account. For example, the score generation engine/module(s) at the remote server may be executed to determine a second number of search queries associated with the second user account. The search queries may be for queries that include a brand name associated with the second user account, products associated with the second user account and/or associated with the content in the second set of digital content, or other related queries. The specific use of terms related to the second user account may be indicative of an impact of content associated with the second user account being presented to users. In order to determine the number of search queries, the search queries may have to be received at, and/or processed by, a central platform, otherwise the data may be unavailable (e.g., a third party may have the data, etc.). The number of search queries may be determined for a particular time period, such as the preceding week, or since a particular content campaign was launched, etc.

At block 270 of the process flow 200, computer-executable instructions stored on a memory of a device, such as a remote server or a user device, may be executed to generate a second score for the first user account based at least in part on a difference between the first number of search queries and the second number of search queries. For example, the score generation engine/module(s) at the remote server may be executed to determine a second score for the first user account based at least in part on the difference between the first number of search queries and the second number of search queries. The second score may be an awareness score in some embodiments.

At block 280 of the process flow 200, computer-executable instructions stored on a memory of a device, such as a remote server or a user device, may be executed to cause presentation of the first score and the second score at a user interface. For example, one or more action implementation modules at a remote server may be executed to generate a user interface that includes the first score and the second score, which may be represented by graphical indicators. The user interface may be sent to a user device for presentation at a display.

In some embodiments, one or more action recommendations may be automatically generated for the first user account based at least in part on the first score and the second score. If the first user account is performing better than the second user account, there may not be any action recommendations with respect to the second user account, but there may be other user accounts that may be used for subsequent score determinations. In some embodiments, computer-executable instructions stored on a memory of a device, such as a remote server or a user device, may be optionally executed to generate an action recommendation for the first user account using the first score and the second score. In some embodiments, a first graphical indicator representing the first score, a second graphical indicator representing the second score, and a third graphical indicator representing the action recommendation may be presented at the user interface.

At optional block 290 of the process flow 200, computer-executable instructions stored on a memory of a device, such as a remote server or a user device, may be executed to automatically implement an action recommendation for the first user account. For example, one or more action implementation modules at a remote server may be executed to automatically implement or execute one or more action recommendation for the first user account. For example, the remote server may automatically modify one or more user settings associated with the first user account based at least in part on a selection at the user interface of a user interface element associated with the action recommendation (e.g., third graphical indicator if presented, etc.).

In some embodiments, a third score may be an awareness score and may be generated in addition to or instead of the first score and the second score. In another example, to determine the awareness score, the remote server may determine a first number of impressions presented before a search query associated with the first user account, and may determine a second number of impressions presented before a search query associated with the second user account. The remote server may generate a third score for the first user account based at least in part on a difference between the first number of impressions and the second number of impressions. The action recommendation for the first user account may therefore be generated, at least in part, using the third score.

In another example, to determine a purchase score, the remote server may determine a first number of impressions presented before a conversion event associated with the first user account, and may determine a second number of impressions presented before a conversion event associated with the second user account. The remote server may generate a third score for the first user account based at least in part on a difference between the first number of impressions and the second number of impressions. The action recommendation for the first user account may therefore be generated, at least in part, using the third score.

Figure 3:
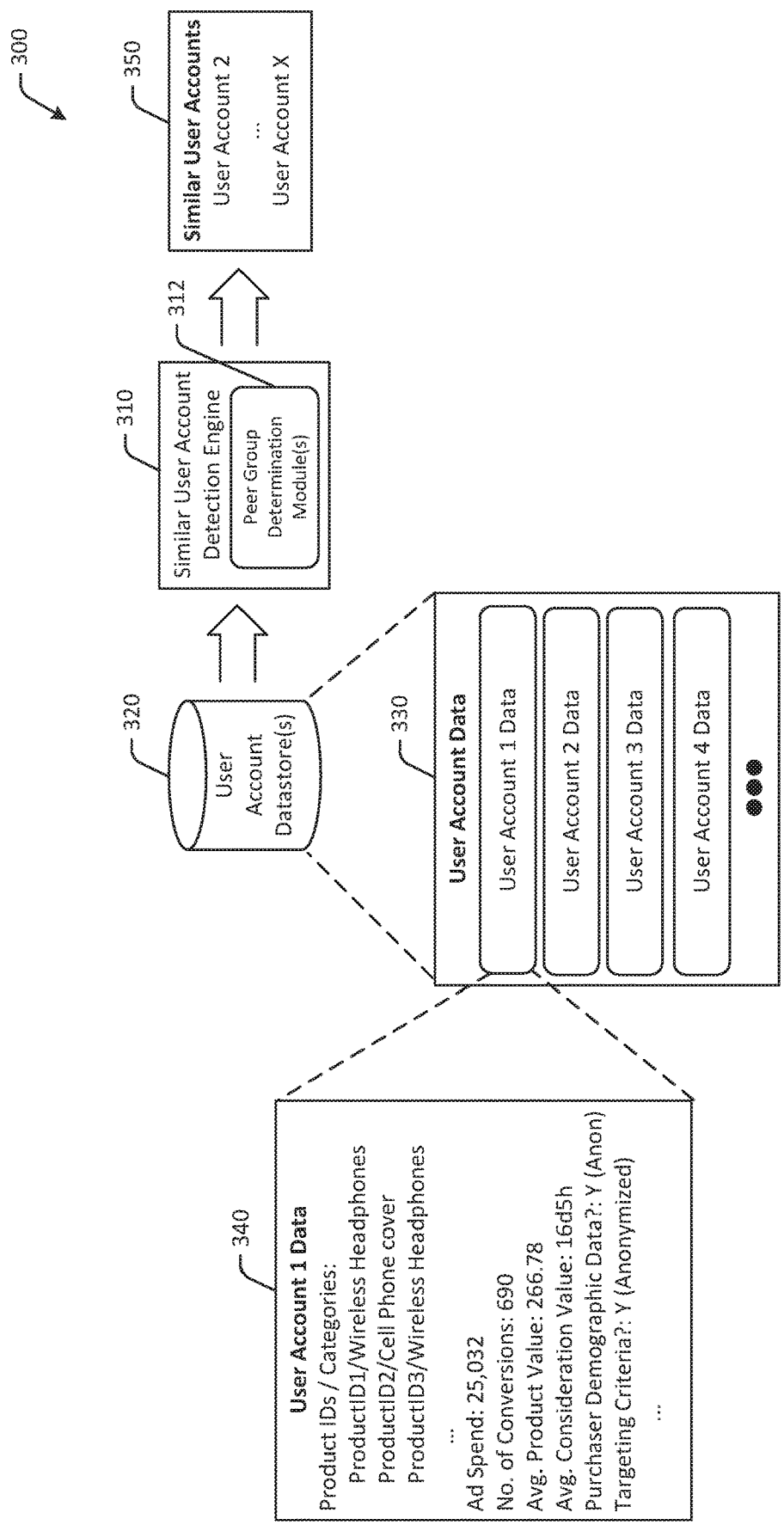
FIG. 3 is a schematic illustration of an example data flow for identifying similar data sets using artificial intelligence in accordance with one or more example embodiments of the disclosure.

FIG. 3 is a schematic illustration of an example data flow for identifying similar data sets using artificial intelligence in accordance with one or more example embodiments of the disclosure. Different embodiments may include different, additional, or fewer inputs or outputs than those illustrated in the example of FIG. 3.

In FIG. 3, a similar user account detection engine 310 may be used to determine user accounts that are similar to a target user account, such as the first user account discussed with respect to FIG. 2. The similar user account detection engine 310 may include one or more peer group determination module(s) 312. To determine similar user accounts, the similar user account detection engine 310 may query a user account datastore(s) 320. The user account datastore(s) 320 may include user account data 330, such as user account identifiers. The user account identifiers may be associated with user account-specific data. For example, user account 1 data 340 may include a set of product identifiers and the corresponding product categories associated with the user account, an ad spend value associated with the user account, a total number of conversions associated with the user account, an average product value of products associated with the user account, an average consideration value or timeframe associated with the user account, an indication of whether anonymized and/or secured purchase demographic data is available, an indication of whether anonymized and/or secured targeting criteria is available, and so forth.

The similar user account detection engine 310 may use the data to output one or more similar user accounts 350. For example, user account 2 may be determined to be similar to user account 1, and so forth. As discussed herein, similarity may be determined based at least in part on one or more of the attributes associated with a user account and/or products or content associated with the user account. Such attributes may include spend, product catalog, campaign targeting, and/or brand ownership. The similar user accounts may be used to determine relative performance for the first user account and/or for content associated with the first user account.

Figure 4:
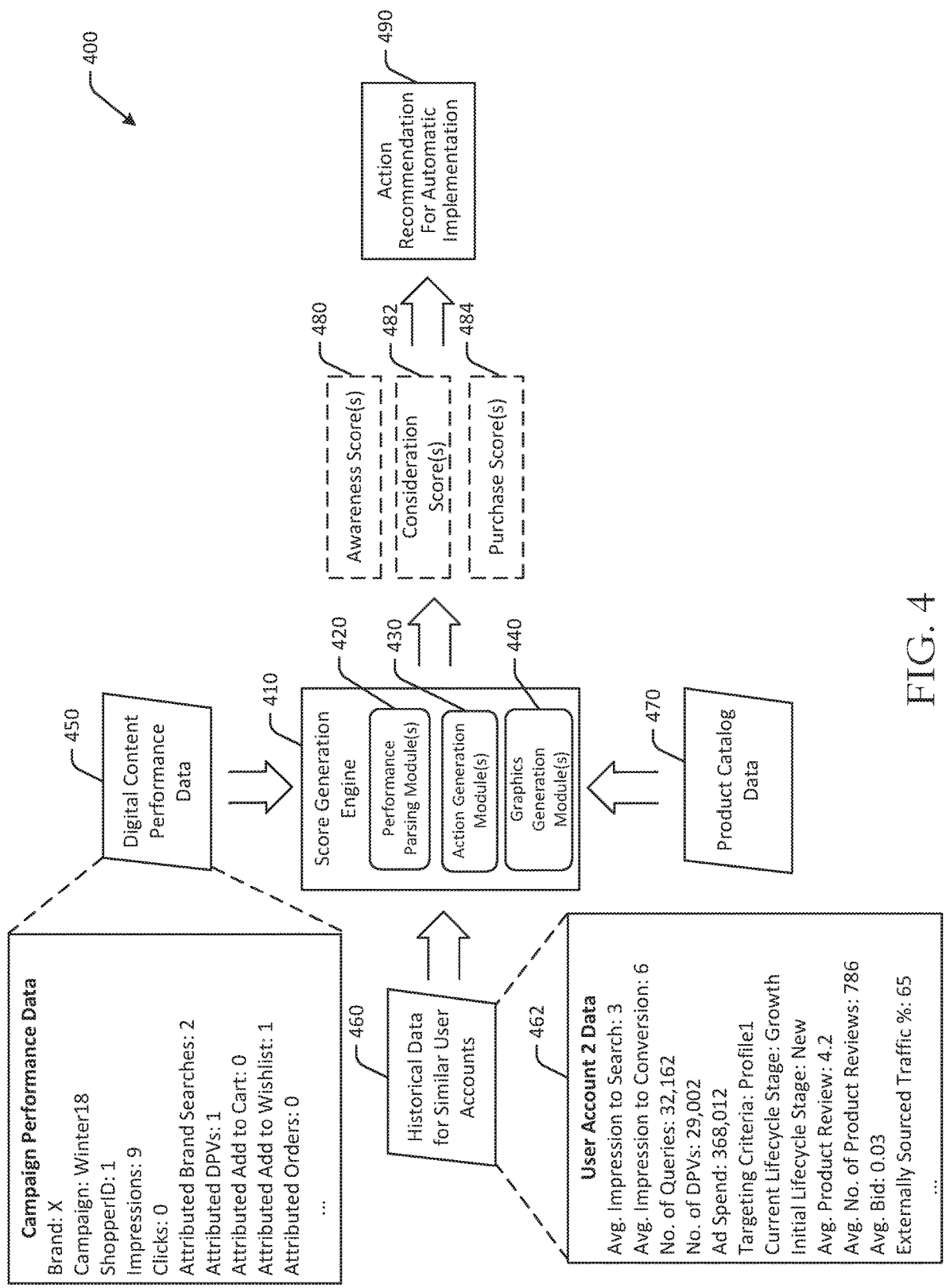
FIG. 4 is a schematic illustration of an example hybrid data and process flow for automated graphic generation for data sets identified using artificial intelligence in accordance with one or more example embodiments of the disclosure.

FIG. 4 is a schematic illustration of an example hybrid data and process flow 400 for automated graphic generation for data sets identified using artificial intelligence in accordance with one or more example embodiments of the disclosure. Different embodiments may include different, additional, or fewer inputs or outputs than those illustrated in the example of FIG. 4.

In FIG. 4, an example hybrid data and process flow 400 is schematically depicted. A score generation engine 410 may be configured to determine generate one or more scores for user accounts relative to peers. The score generation engine 410 may be stored at and/or executed by one or more remote servers. The score generation engine 410 may include one or more modules and/or algorithms, and may be configured to output one or more scores.

For example, the score generation engine 410 may include one or more performance parsing modules 420, one or more action generation modules 430, and/or one or more graphics generation modules 440. Additional or fewer, or different, modules may be included. The performance parsing module(s) 420 may be configured to extract or determine historical data for one or more user accounts. For example, the performance parsing module(s) 420 may be configured to ingest or parse historical content performance data and determine one or more difference values between sets of data. The performance parsing module(s) 420 may be configured to determine data that corresponds to a particular period of time and may extract the particular data. In some embodiments, the performance parsing module(s) 420 may extract data from similar user accounts.

The action generation module(s) 430 may be configured to process and/or analyze historical user actions and associated changes in performance, and reapply strategies based at least in part on current performance associated with a user account. In some instances, the action generation module(s) 430 may be configured to generate recommended actions using thresholds. For example, if targeting criteria for a user account satisfies a difference threshold, the targeting criteria may be changed as a recommended action. However, if the targeting criteria is substantially accurate, the recommended action may not include the targeting criteria change. The action generation module(s) 430 may be configured to monitor changes to performance over time and may be configured to determine recommended actions in or near real-time.

The graphics generation module(s) 440 may be configured to generate graphics, graphical indicators, and/or user interfaces for presentation at displays. The graphics generation module(s) 440 may be configured to output graphics illustrating relative performance of a user account.

The score generation engine 410 may receive one or more inputs that may be used to determine performance scores. For example, the score generation engine 410 may receive digital content performance data 450 that may include historical performance metrics for content associated with various user accounts. For example, the digital content performance data 450 may include campaign performance data that illustrates performance of a content delivery campaign. In the illustrated example, the campaign performance data may include a brand identifier, a campaign identifier, an anonymous consumer identifier, a number of impressions presented associated with the campaign, a number of clicks or interactions, a number of attributed brand searches, a number of attributed detail page views, a number of attributed add to cart events, a number of attributed add to wishlist events, a number of attributed orders, and so forth.

The score generation engine 410 may process the digital content performance data 450 to determine content performance for the user account and for the similar user accounts. The score generation engine 410 may determine historical data for the similar user accounts using the digital content performance data 450. Some of the data may be used to calculate scores for the first user account.

The score generation engine 410 may receive historical data for similar user accounts 360. The historical data for similar user accounts 460 may include historical performance data for user accounts that are determined to be similar to the first user account. For example, the historical data for similar user accounts 460 may include an example data record 462. The data record 462 may be for a second user account. The data record 462 may indicate that, for the second user account, an average number of impressions before a search is performed by a consumer is two impressions, an average number of impressions before a conversion event is performed by a consumer is six impressions, a total number of queries is 32,162, a total number of detailed page views is 29,002, an ad spend is 368,012, the targeting criteria is a certain profile, the current lifecycle stage of brand(s) associated with the second user account is growth, the initial lifecycle stage for which data is available for the second user account is new brand, the average product review for products associated with the second user account is 4.2 out of 5.0, the average number of product reviews for products associated with the second user account is 786, the average bid price for content slots is 0.03, and so forth. Conversion events, as described with respect to historical data for similar user accounts 460, may include conversion events such as click event conversions, purchase event conversions, add to cart event conversions, add to wishlist event conversions, and/or other positive user interaction events that may be attributable to presentation of content impressions.

The data record 462 may also include data related to externally sourced or driven traffic to for example, pages associated with products of a user account. For example, as illustrated in FIG. 4, a percentage of externally sourced traffic may be captured and used to determine recommended actions. The user account illustrated in the data record 462 may indicate that 65% of traffic is externally sourced, or directed from an external site, such as a social media site, search engine sites, and so forth. Accordingly, if the user account for which an action recommendation is being generated has significantly less externally sourced traffic, a recommendation may be to increase external traffic from one or more particular sources. External traffic may include traffic driven by third parties and may be online or offline (e.g., physical advertisements or content may drive traffic in some instances, etc.).

The score generation engine 410 may use the historical data for similar user accounts 360 to determine relative performance for the first user account. The relative determinations may be completed using the historical data for similar user accounts 360 and the first user account data from the digital content performance data 450.

The score generation engine 410 may receive product catalog data 470. The product catalog data may include product information and categories for various user accounts and may be used to determine similar user accounts, in one example.

Using one or more algorithms or modules, the score generation engine 410 may optionally determine one or more scores. For example, the score generation engine 410 may output an optional awareness score 480, an optional consideration score 482, and/or an optional purchase score 484. The one or more scores may be presented using graphical indicators.

Factors that may be used as inputs to determine awareness scores may include organic search impression index, impression assisted conversions, new to brand impressions, impression based auction metrics, bid rank, impression share, impression share lost to bids, impression share lost to budgets, and the like.

Factors that may be used as inputs to determine consideration scores may include new to brand purchases, add to wishlist, review reads, add to cart, reviews, review count, review score, pages count compared to cohort, count of pages viewed, and the like.

Factors that may be used as inputs to determine purchase scores may include win rate, basket size, targeting relevancy, invalid keywords, keyword relevancy, listing eligibility, buy box percentage, listing quality score, percentage of days out of budget, catalog coverage, promoted product perception score, sales rank in catalog, organic search rank index, excess inventory, new products not advertised, active coupons not being advertised, and the like.

Based at least in part on the one or more scores, the score generation engine 410 may output an action recommendation for automatic implementation 490. The action recommendation may be automatically implemented by the score generation engine or a different module in some embodiments.

Figure 5A:
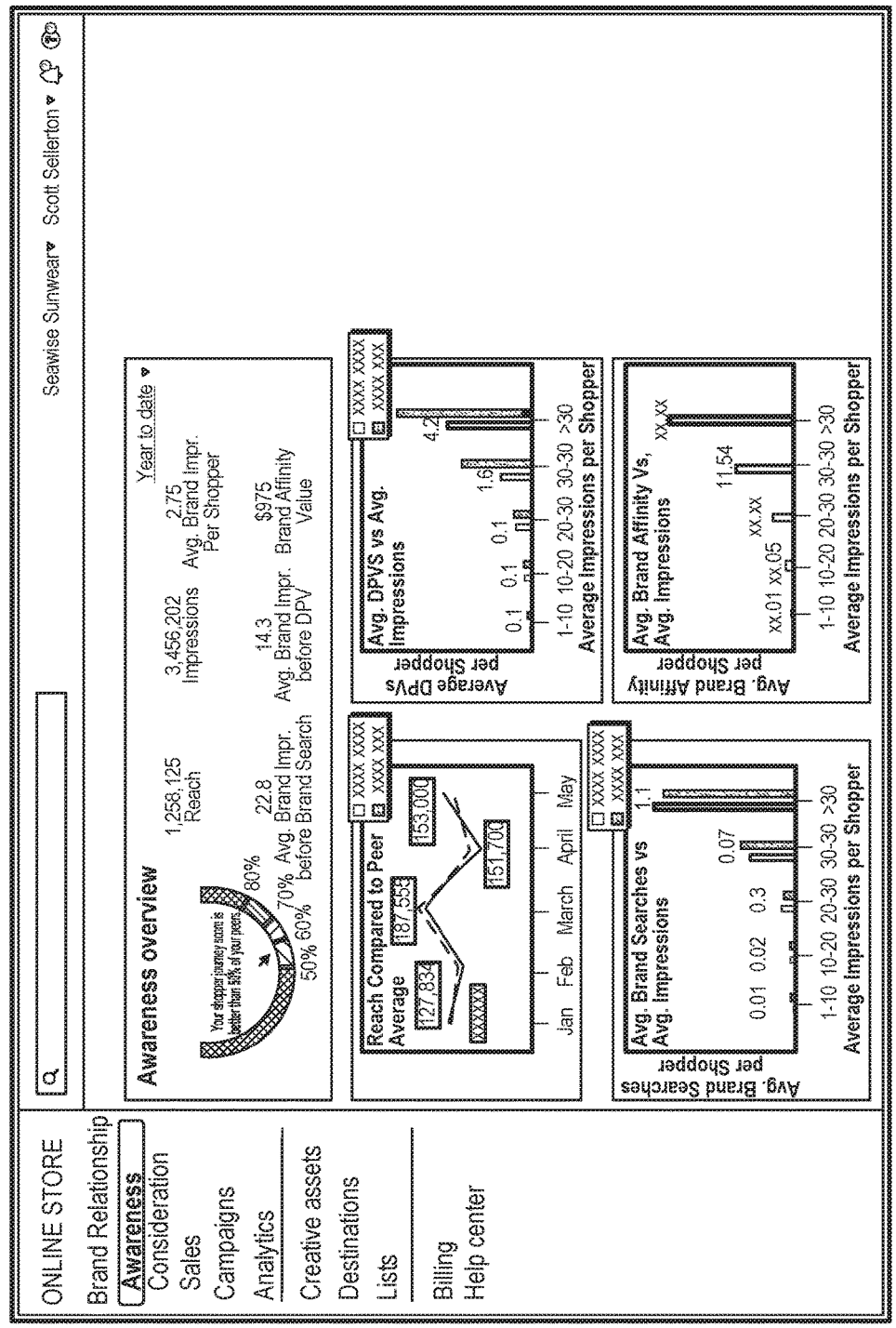
Figure 5B:
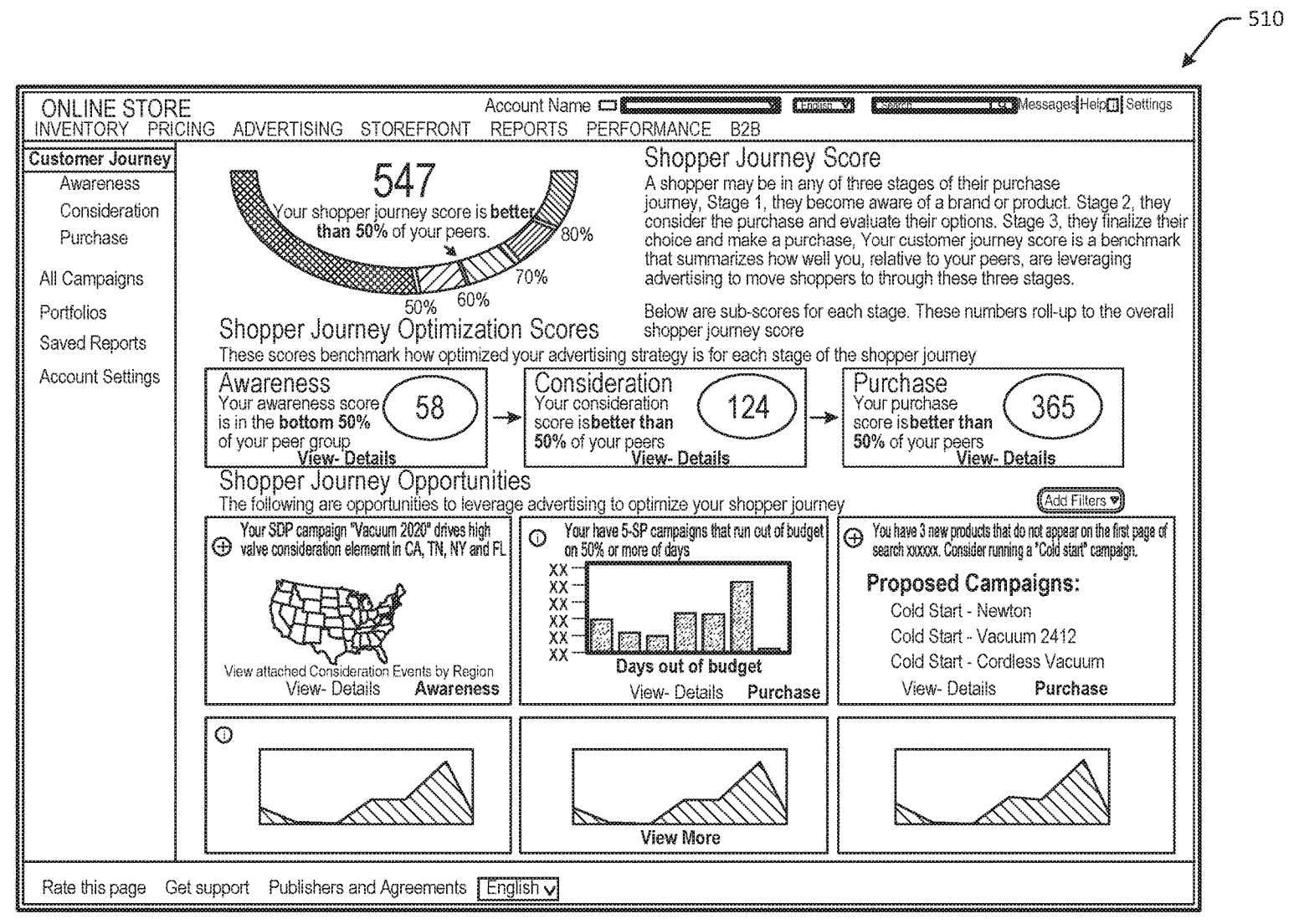

FIGS. 5A-5B are schematic illustration of example user interfaces including automated graphic generation for data sets identified using artificial intelligence in accordance with one or more example embodiments of the disclosure. Although illustrated with certain user interface elements, other embodiments may include additional or fewer, or different, elements.

In FIG. 5A, a first user interface 500 illustrates graphical indicators that represent performance of a user account and associated content relative to a set of similar or peer user accounts. For example, an awareness overview illustrates relative awareness scoring, average impression metrics, and so forth. Additional graphics illustrate relative reach, relative brand searches, relative impressions presented, average brand affinity, and so forth. The first user interface 500 may be presented to a user of the first user account. Similar user interfaces may be presented for consideration performance and purchase/sales performance. The first user interface 500 may also be used to monitor improvement over time. For example, a remote server may determine a change in a first score after the one or more recommended actions are implemented, and a fourth graphical indicator representing the change may be presented.

In FIG. 5B, a second user interface 510 illustrates graphical indicators that represent a consumer journey over time. For example, brands associated with the user account may have different consumers, and the consumers may experience a journey before purchasing products associated with the brand(s). The second user interface 510 illustrates graphical data related to consumer journey performance relative to similar user accounts, along with an optional text summary. The second user interface 510 may include one or more graphical indicators representing respective awareness, consideration, and purchase scores. The illustrated purchase score may be determined using user loyalty metrics, which may include repeat purchases, recurring purchases, average subscription time lengths or subscription enrollment metrics, and/or other metrics related to loyalty amongst users. In some embodiments, a separate loyalty score may be generated using these factors and may be presented as part of the user interface.

Additional metrics, including proposed campaigns, out of budget data, and geolocation data may be presented. Accordingly, the examples of FIGS. 5A-5B illustrate the graphical nature of the user interfaces used to illustrate relative performance.

One or more operations of the methods, process flows, or use cases of FIGS. 1-5B may have been described above as being performed by a user device, or more specifically, by one or more program module(s), applications, or the like executing on a device. It should be appreciated, however, that any of the operations of the methods, process flows, or use cases of FIGS. 1-5B may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5B may be described in the context of the illustrative devices, it should be appreciated that such operations may be implemented in connection with numerous other device configurations.

The operations described and depicted in the illustrative methods, process flows, and use cases of FIGS. 1-5B may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
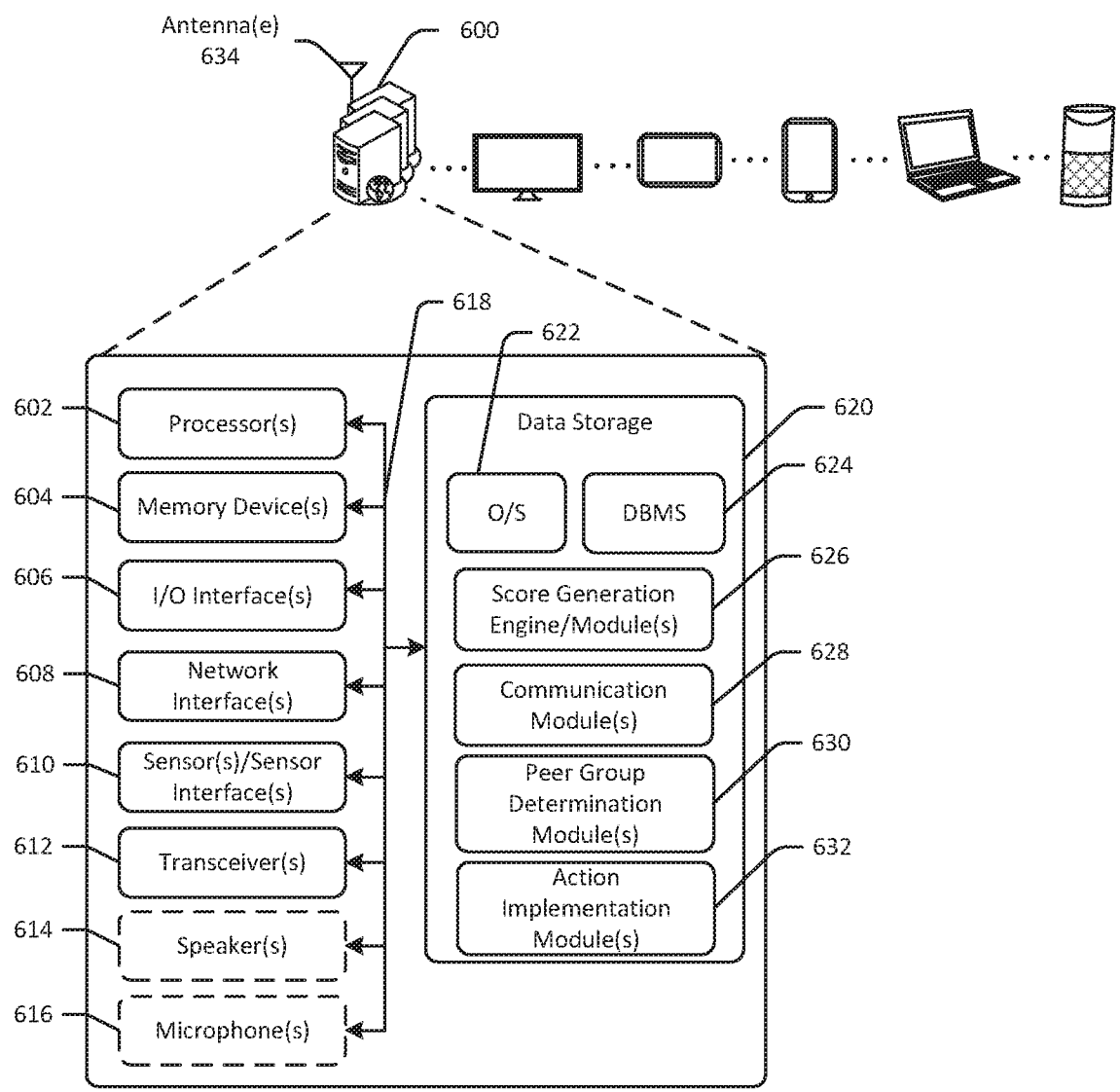
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or sending data including, but not limited to, a server device, a mobile device such as a smartphone, tablet, e-reader, wearable device, or the like; a desktop computer; a laptop computer; a content streaming device; a set-top box; or the like. The remote server 600 may correspond to an illustrative device configuration for the devices of FIGS. 1-5B. In some embodiments, a group or a fleet of servers may be configured to perform one or more operations in a distributed computing environment.

The remote server 600 may be configured to communicate via one or more networks with one or more servers, datastores, user devices, or the like. In some embodiments, a single remote server or single group of remote servers may be configured to perform more than one type of graphics generation and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The remote server 600 may further include one or more buses 618 that functionally couple various components of the remote server 600. The remote server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more score generation engine/module(s) 626, one or more communication module(s) 628, one or more peer group determination module(s) 630, and/or one or more action implementation module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, historical interaction information, historical performance information, historical action information, and/or other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the score generation engine/module(s) 626 may include computer-executable instructions, code, or the like that responsive to execution by one or more of the processor(s) 602 may perform functions including, but not limited to, determining one or more algorithms, determining one or more score values, determining performance metrics, monitoring content performance, generating one or more scores, generating peer groups, generating one or more machine learning models or algorithms, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers and/or user devices, communicating with remote datastores, sending or receiving notifications or commands/directives, communicating with cache memory data, communicating with user interfaces, and the like.

The peer group determination module(s) 630 may include computer-executable instructions, code, or the like that responsive to execution by one or more of the processor(s) 602 may perform functions including, but not limited to, generating classifications, generating sets of peer groups, determining similar peer user accounts, generating requests for automated action implementation, generating recommended actions, and the like.

The action implementation module(s) 632 may include computer-executable instructions, code, or the like that responsive to execution by one or more of the processor(s) 602 may perform functions including, but not limited to, automatically implementing one or more recommended actions, generating recommendations, determining corresponding sets of data, generating graphical user interfaces and/or graphical indicators, controlling user interfaces at user devices, and the like.

Referring now to other illustrative components depicted as being stored in the data storage 620, the O/S 622 may be loaded from the data storage 620 into the memory 604 and may provide an interface between other application software executing on the remote server 600 and hardware resources of the remote server 600. More specifically, the O/S 622 may include a set of computer-executable instructions for managing hardware resources of the remote server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   receiving, by one or more computer processors coupled to memory, a request to generate graphical data illustrating performance metrics of a first user account relative to similar user accounts;
   determining a first set of product identifiers associated with the first user account;
   determining that a majority of the first set of product identifiers are associated with a first product category;
   determining a second set of product identifiers associated with a second user account;
   determining that a majority of the second set of product identifiers are associated with the first product category;
   determining that the second user account is similar to the first user account;
   determining a first number of search queries associated with the first user account during a first time period;
   determining a second number of search queries associated with the second user account during the first time period;
   generating an awareness score for the first user account based at least in part on a difference between the first number and the second number;
   determining a first set of digital content associated with the first user account;
   determining a first average number of impressions prior to a conversion event for the first set of digital content;
   determining a second set of digital content associated with the second user account;
   determining a second average number of impressions prior to a conversion event for the second set of digital content;
   generating a consideration score for the first user account based at least in part on a difference between the first average number and the second average number;
   determining a first average product review score for the first set of product identifiers;
   determining a second average product review score for the second set of product identifiers;

generating a purchase score for the first user account based at least in part on a difference between the first average product review score and the second average product review score;
generating a first graphical representation comprising representations of the awareness score, the consideration score, and the purchase score;
transmitting the first graphical representation to a user device for presentation at a user interface;
determining that a first set of targeting criteria associated with the first set of digital content is different than a second set of targeting criteria associated with the second set of digital content;
determining that a first allocation rule associated with the first set of digital content is different than a second allocation rule associated with the second set of digital content;
causing presentation of a first graphical indicator representing the awareness score, a second graphical indicator representing the consideration score, and a third graphical indicator representing the second allocation rule at the user interface;
automatically modifying, by the one or more computer processors, the user interface comprising one or more user settings associated with the first user account without user input by replacing the first set of targeting criteria with the second set of targeting criteria based at least in part on the selection at the user interface of a user interface element associated with the third graphical indicator;
automatically adjusting, using artificial intelligence, the first allocation rule to match the second allocation rule; and
generating a second graphical representation depicting changes to the awareness score, the consideration score, and the purchase score at a second time interval.

2. The method of claim 1, further comprising:
determining first demographic data associated with purchasers of the first set of product identifiers;
determining second demographic data associated with purchasers of the second set of product identifiers;
determining a first total number of conversion events associated with the first user account;
determining a second total number of conversion events associated with the second user account;
determining a first average price associated with the first set of product identifiers; and
determining a second average price associated with the second set of product identifiers;
wherein determining that the second user account is similar to the first user account comprises determining that the second user account is similar to the first user account based at least in part on the majority, the first demographic data, the second demographic data, the first total number, the second total number, the first average price, and the second average price.

3. The method of claim 1, further comprising:
generating a first graphical indicator representing the awareness score relative to the second user account;
generating a second graphical indicator representing the consideration score relative to the second user account;
generating a third graphical indicator representing the purchase score relative to the second user account; and
causing presentation of the first graphical indicator, the second graphical indicator, and the third graphical indicator at the user interface.

4. A method comprising:
determining, by one or more computer processors coupled to memory, a set of user accounts that are similar to a first user account, wherein the set of user accounts comprises a second user account;
determining first historical performance data for a first set of digital content associated with the first user account;
determining second historical performance data for a second set of digital content associated with the second user account;
determining a first average product review score for a first set of product identifiers;
determining a second average product review score for a second set of product identifiers;
generating a first score for the first user account based at least in part on a difference between the first historical performance data and the second historical performance data, and a difference between the first average product review score and the second average product review score;
determining a first number of search queries associated with the first user account during a first time period;
determining a second number of search queries associated with the second user account during the first time period;
generating a second score for the first user account based at least in part on a difference between the first number of search queries and the second number of search queries;
generating a first graphical representation comprising representations of the first score and the second score;
transmitting the first graphical representation to a user device for presentation at a user interface;
determining an action recommendation for the first user account using the first score and the second score, wherein a first user account performance of the first user account is based at least in part on the first score and the second score;
causing presentation of a first graphical indicator representing the first score, a second graphical indicator representing the second score, and a third graphical indicator representing the action recommendation at the user interface; and
implementing, by the one or more computer processors and using artificial intelligence, the action recommendation by automatically replacing one or more user settings associated with the first user account in a database without user input based at least in part on the selection at the user interface of a user interface element associated with the third graphical indicator.

5. The method of claim 4, further comprising:
determining a first number of impressions presented before a search query associated with the first user account;
determining a second number of impressions presented before a search query associated with the second user account; and
generating a third score for the first user account based at least in part on a difference between the first number of impressions and the second number of impressions;
wherein determining the action recommendation for the first user account comprises determining the action recommendation for the first user account using the first score, the second score, and the third score, and wherein the first user account performance of the first user account is based at least in part on the first score, the second score, and the third score.

6. The method of claim 4, further comprising:
determining a change in the first score after the one or more user settings are replaced; and
generating a fourth graphical indicator representing the change.

7. The method of claim 4, further comprising:
determining a content spend value associated with the first user account;
determining targeting criteria for the first set of digital content; and
determining a set of product identifiers associated with the first user account;
wherein determining the set of user accounts that are similar to the first user account comprises determining the set of user accounts that are similar to the first user account using the content spend value, the targeting criteria, and the set of product identifiers.

8. The method of claim 7, further comprising:
determining respective product category identifiers associated with the set of product identifiers; and
determining demographic data associated with purchasers of the set of product identifiers;
wherein determining the set of user accounts that are similar to the first user account comprises determining the set of user accounts that are similar to the first user account using the content spend value, the targeting criteria, the set of product identifiers, the respective product category identifiers, and the demographic data.

9. The method of claim 4, further comprising:
determining a set of product identifiers associated with the first user account; and
determining an average price associated with the set of product identifiers;
wherein determining the set of user accounts that are similar to the first user account comprises determining the set of user accounts that are similar to the first user account using the average price.

10. The method of claim 4, further comprising:
determining a total number of conversion events associated with the first user account;
determining a second time period in which the total number of conversion events associated with the second user account occurred;
wherein the second historical performance data is from the second time period.

11. The method of claim 4, further comprising:
determining a first number of impressions presented before a conversion event associated with the first user account;
determining a second number of impressions presented before a conversion event associated with the second user account; and
generating a third score for the first user account based at least in part on a difference between the first number of impressions and the second number of impressions;
wherein determining the action recommendation for the first user account comprises generating the action recommendation for the first user account using the first score, the second score, and the third score, and wherein the first user account performance of the first user account is based at least in part on the first score, the second score, and the third score.

12. The method of claim 4, wherein the set of user accounts is designated by the first user account.

13. A system comprising:
memory configured to store computer-executable instructions; and
at least one computer processor configured to access the memory and execute the computer-executable instructions to:
determine a set of user accounts that are similar to a first user account, wherein the set of user accounts comprises a second user account;
determine first historical performance data for a first set of digital content associated with the first user account;
determine second historical performance data for a second set of digital content associated with the second user account;
determine a first average product review score for a first set of product identifiers;
determine a second average product review score for a second set of product identifiers;
generate a first score for the first user account based at least in part on a difference between the first historical performance data and the second historical performance data, and a difference between the first average product review score and the second average product review score;
determine a first number of search queries associated with the first user account during a first time period;
determine a second number of search queries associated with the second user account during the first time period;
generate a second score for the first user account based at least in part on a difference between the first number of search queries and the second number of search queries;
generate a first graphical representation comprising representations of the first score and the second score;
transmit the first graphical representation to a user device for presentation at a user interface;
determine an action recommendation for the first user account using the first score and the second score, wherein a first user account performance of the first user account is based at least in part on the first score and the second score;
cause presentation of a first graphical indicator representing the first score, a second graphical indicator representing the second score, and a third graphical indicator representing the action recommendation at the user interface; and
implement, by the at least one computer processor and using artificial intelligence, the action recommendation by automatically replacing one or more user settings associated with the first user account in a database without user input based at least in part on the selection at the user interface of a user interface element associated with the third graphical indicator.

14. The system of claim 13, wherein the at least one processor is further configured to access the memory and execute the computer-executable instructions to:
determine a first number of impressions presented before a search query associated with the first user account;
determine a second number of impressions presented before a search query associated with the second user account; and
generate a third score for the first user account based at least in part on a difference between the first number of impressions and the second number of impressions.

* * * * *